US012174567B2

(12) United States Patent
Huang et al.

(10) Patent No.: US 12,174,567 B2
(45) Date of Patent: Dec. 24, 2024

(54) IMAGE FORMING APPARATUS AND CONTROL METHOD THEREOF, AND ELECTRONIC APPARATUS FOR PERFORMING IDLING

(71) Applicant: Zhuhai Pantum Electronics Co., Ltd., Zhuhai (CN)

(72) Inventors: Yuanli Huang, Zhuhai (CN); Wenjie Ye, Zhuhai (CN); Yubing Cao, Zhuhai (CN); Haifei Gong, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/744,907

(22) Filed: May 16, 2022

(65) Prior Publication Data

US 2022/0373942 A1 Nov. 24, 2022

(30) Foreign Application Priority Data

May 20, 2021 (CN) ......................... 202110552772.6
Jul. 8, 2021 (CN) ......................... 202110772675.8

(51) Int. Cl.
*G03G 15/00* (2006.01)
*G03G 15/20* (2006.01)

(52) U.S. Cl.
CPC ....... *G03G 15/205* (2013.01); *G03G 15/5004* (2013.01); *G03G 15/5008* (2013.01)

(58) Field of Classification Search
CPC ............. G03G 15/205; G03G 15/5008; G03G 15/0865; G03G 15/0875; G03G 15/0881;
(Continued)

(56) References Cited

U.S. PATENT DOCUMENTS

2002/0122673 A1* 9/2002 Sakai ................. G03G 15/0266 399/50
2004/0126127 A1* 7/2004 Fujimori .............. G03G 15/205 399/70
(Continued)

FOREIGN PATENT DOCUMENTS

EP 1059573 A2 * 12/2000 ......... G03G 15/0822
EP 2202589 A1 6/2010
(Continued)

OTHER PUBLICATIONS

The European Patent Office (EPO) The Extended European Search Report for 22173653.1 Jan. 2, 2023 9 Pages.
(Continued)

*Primary Examiner* — Robert B Beatty
(74) *Attorney, Agent, or Firm* — ANOVA LAW GROUP, PLLC

(57) ABSTRACT

Embodiments of the present disclosure provide a control method of an image forming apparatus, an image forming apparatus, and an electronic apparatus. The control method includes detecting whether the image forming apparatus currently satisfies a condition for performing idling; and when the condition for performing the idling is satisfied and before the image forming apparatus starts image formation, enabling the image forming apparatus to perform the idling until a preset time duration is reached for the idling. According to embodiments of the present disclosure, the image forming apparatus is enabled to perform idling for a time duration before starting image formation to mix the moist toner with the non-moist toner, thereby reducing the background gray of printed images and avoiding reduced image quality problem when the moist toner is used to perform printing.

9 Claims, 4 Drawing Sheets

(58) Field of Classification Search
CPC ........... G03G 15/0882; G03G 15/0884; G03G 2215/068; G03G 2215/0687; G03G 2215/069; G03G 15/5004
USPC ............................................. 399/36, 70, 127
See application file for complete search history.

(56) References Cited

U.S. PATENT DOCUMENTS

2004/0136744 A1* 7/2004 Endo .................... G03G 15/205 399/70
2005/0095015 A1* 5/2005 Arai ....................... G03G 15/50 399/27
2006/0165429 A1* 7/2006 Satoh ................. G03G 15/2039 399/69
2010/0028025 A1 2/2010 Yoshida et al.
2010/0028026 A1 2/2010 Inami et al.
2010/0166458 A1* 7/2010 Mase ................. G03G 15/0877 399/119
2011/0123233 A1* 5/2011 Hokkyoh ........... G03G 15/0818 399/269
2012/0155926 A1 6/2012 Okuda
2013/0011145 A1* 1/2013 Nishimura ......... G03G 21/0094 399/346
2019/0243280 A1* 8/2019 Wakisaka ............. G03G 15/086
2019/0332030 A1* 10/2019 Taniguchi .......... G03G 21/1889
2020/0201202 A1* 6/2020 Miura ................ G03G 15/0225

FOREIGN PATENT DOCUMENTS

JP H06149129 A 5/1994
JP 2001056601 A * 2/2001 ......... G03G 15/0822
JP 2001356670 A 12/2001
JP 2004130784 A 4/2004
JP 2015025908 A 2/2015
JP 2015161884 A 9/2015
KR 20050102802 A 10/2005
KR 2012-0026890 A * 3/2012

OTHER PUBLICATIONS

The European Patent Office (EPO) Office Action 1 for 22173653.1 Oct. 6, 2023 8 Pages.
The European Patent Office (EPO) Office Action 2 for 22173653.1 Mar. 13, 2024 7 Pages.

* cited by examiner

IMAGE FORMING APPARATUS AND CONTROL METHOD THEREOF, AND ELECTRONIC APPARATUS FOR PERFORMING IDLING

CROSS-REFERENCE TO RELATED APPLICATION

This application claims the priority to Chinese patent application No. 202110552772.6, filed on May 20, 2021; and No. 202110772675.8, filed on Jul. 8, 2021, in the China National Intellectual Property Administration, the entirety of all of which is incorporated herein by their reference.

TECHNICAL FIELD

The present disclosure generally relates to the field of image forming apparatus technology and, more particularly, relates to an image forming apparatus and its control method, and an electronic apparatus.

BACKGROUND

A sealing film is disposed in a toner cartridge of an image forming apparatus to divide toner in the toner cartridge into two parts. A part of the toner is not isolated with protection and easy to become moist in a high temperature and high humidity environment, while the other part of the toner is not moist due to isolation function of the sealing film. When such toner cartridge is installed on the image forming apparatus to directly perform printing, the moist toner is used first which results in background gray on printed images, thereby reducing the quality of printed images.

SUMMARY

One aspect of the present disclosure provides a control method of an image forming apparatus. The method includes detecting whether the image forming apparatus currently satisfies a condition for performing idling; and when the condition for performing the idling is satisfied and before the image forming apparatus starts image formation, enabling the image forming apparatus to perform the idling until a preset time duration is reached for the idling.

Another aspect of the present disclosure provides an image forming apparatus. The image forming apparatus includes: a detection unit, configured to detect whether the image forming apparatus currently satisfies a condition for performing idling; a control unit, configured to when the condition for performing the idling is satisfied and before the image forming apparatus starts image formation, enable the image forming apparatus to perform the idling until a preset time duration is reached for the idling.

Another aspect of the present disclosure provides an image forming apparatus. The apparatus includes a memory, storing a computer program for performing a control method of the image forming apparatus; and a processor, coupled with the memory and when the computer program being executed, configured to: detect whether the image forming apparatus currently satisfies a condition for performing idling; and when the condition for performing the idling is satisfied and before the image forming apparatus starts image formation, enable the image forming apparatus to perform the idling until a preset time duration is reached for the idling.

Another aspect of the present disclosure provides a non-transitory computer-readable storage medium containing a computer program, and when being executed, the computer program causes a processor to perform a control method of an image forming apparatus. The method includes detecting whether the image forming apparatus currently satisfies a condition for performing idling; and when the condition for performing the idling is satisfied and before the image forming apparatus starts image formation, enabling the image forming apparatus to perform the idling until a preset time duration is reached for the idling.

Other aspects of the present disclosure can be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

DETAILED DESCRIPTION

To better understand the technical solutions of the present disclosure, embodiments of the present disclosure are described in detail below with reference to accompanying drawings.

It should be noted that described embodiments are only some, but not all, embodiments of the present disclosure. Based on embodiments of the present disclosure, all other embodiments obtained by those skilled in the art without creative efforts shall fall within the protection scope of the present disclosure.

The image forming apparatus is an apparatus having at least one function related to image formation. Above-mentioned functions related to image formation may include, but not be limited to, a printing function, a scanning function, a copying function, and a facsimile function.

A single-function printer is an image forming apparatus with a printing function only.

A multi-function printer is an image forming apparatus with printing, copying, scanning, and/or faxing functions, where the number of paper trays may be selectively configured.

For a digital compound machine, based on the copying function with standard or optional printing, scanning, faxing functions, file output may be performed by a laser printing manner using digital principle; and images and texts may be edited as needed. The digital compound machine may have a large capacity paper tray, with high memory, large hard disk, strong network support and multitasking parallel processing capability.

Figure 1A:
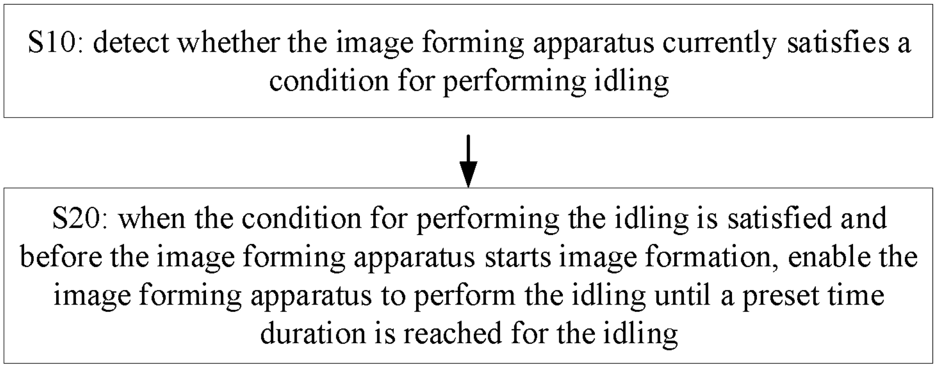
FIG. 1A illustrates a schematic flowchart of key steps of a control method of an image forming apparatus provided by exemplary embodiments of the present disclosure.

FIG. 1A illustrates a schematic flowchart of key steps of a control method of an image forming apparatus provided by exemplary embodiments of the present disclosure. The method may include following exemplary key steps.

At S10, whether the image forming apparatus currently satisfies a condition for performing idling may be detected.

For example, whether the image forming apparatus currently satisfies the condition for performing idling may be detected, that is, whether the toner cartridge of the image forming apparatus is used for the first time or whether the image forming apparatus has performed idling may be detected. The condition for performing idling herein may indicate that the toner cartridge installed in the image forming apparatus is used for the first time and may also indicate that the image forming apparatus has not performed idling on the toner cartridge.

For example, when the condition for performing idling indicates that the toner cartridge installed in the image forming apparatus is used for the first time, the main body of the image forming apparatus and the toner cartridge may exchange information to detect whether the toner cartridge is new or is used for the first time. When the toner cartridge is new or is used for the first time, it indicates that the image forming apparatus currently may satisfy the condition for performing idling, that is, idling may need to be performed. For a new toner cartridge or a toner cartridge that is used for the first time, even if the sealing film is removed, the moist toner may be preferentially used for printing. Therefore, to avoid background gray on the printed images, for a new toner cartridge or a toner cartridge that is used for the first time, idling may need to be performed to mix the moist toner and the non-moist toner.

When the condition for performing idling is that the image forming apparatus has not perform idling, for example, the image forming apparatus may first configure a storage unit for storing an idling mark, that is, whether idling needs to be performed may be determined by detecting the idling mark in the storage unit. When the idling mark in the storage unit indicates that idling has not been performed, it indicates that the image forming apparatus currently may satisfy the condition for performing idling. After the image forming apparatus performs idling, the idling mark may be updated, so that the idling mark may indicate that the image forming apparatus has performed idling, and the condition for performing idling may not be satisfied. In addition, it can also that the main body of the image forming apparatus and the toner cartridge may exchange information to detect whether the idling mark has been stored in the toner cartridge. If the idling mark is stored, it indicates that the toner cartridge may need to perform idling, that is, the image forming apparatus may satisfy the condition for performing idling. If the idling mark is not stored, it indicates that idling may not need to be performed. After the image forming apparatus has performed idling, the idling mark stored in the toner cartridge may be cleared, and the idling mark may not be stored. In addition, a mark bit may be configured in the storage unit of the toner cartridge to indicate whether idling needs to be performed. For example, when the mark bit is 1, it indicates that idling needs to be performed; and when the mark bit is 0, it indicates that idling does not need to be performed. After the main body of the image forming apparatus is connected to the toner cartridge, the mark bit stored in the internal storage unit of the toner cartridge may be read to detect whether the condition for performing idling is satisfied. After the image forming apparatus has performed idling, the mark bit stored in the internal storage unit of the toner cartridge may be cleared.

If the image forming apparatus detects that the toner cartridge is used for the first time or is a new toner cartridge or detects that the image forming apparatus has not performed idling before image formation, it determines that the image forming apparatus may need to perform idling. On the contrary, if the image forming apparatus detects that the toner cartridge has been used or the image forming apparatus has performed idling, it determines that the image forming apparatus may not need to perform idling. Obviously, by detecting whether the image forming apparatus currently satisfies the condition for performing idling, it determines in advance whether idling needs to be performed before starting image formation. Therefore, in the case that the toner cartridge has been used or the image forming apparatus has performed idling, there is no need to perform additional idling, thereby avoiding unnecessary energy consumption and print output time.

At S20, when the condition for performing the idling is satisfied and before the image forming apparatus starts image formation, the image forming apparatus may be enabled to perform the idling until a preset time duration is reached for the idling.

If the image forming apparatus currently satisfies the condition for performing idling, in a warm-up stage before starting image formation, the image forming apparatus may be driven to start idling. That is, at least one component of an OPC (organic photoconductor), a developing roller, a toner feeding roller, and a stirring blade in the image forming apparatus may be driven to start idling, and timing may be controlled to perform idling to reach a preset time duration. It should be understood that timing may be controlled perform idling to reach a preset time duration which may be a cumulative timing (e.g., 30 s), or a countdown (e.g., 30 s). It should be noted that the warm-up stage before image formation may be performing cleaning, heating and pressurizing after the initial power-on or wake-up from a sleep state; heating the temperature to the standby temperature; when the image forming apparatus obtains the temperature needed for actual printing, heating the temperature from the standby temperature to an actual printing temperature. That is, the warm-up stage before starting image formation herein may refer to the warm-up stage where cleaning, heating, and pressurizing are performed after power-on or wake-up from the sleep state, and the temperature is heated to the standby temperature; or may refer to the warm-up stage where the temperature is heated from above-mentioned standby temperature to the actual printing temperature. Optionally, the image forming apparatus may be driven to start idling during the warm-up stage where cleaning, heating, and pressurizing are performed after power-on or wake-up from the sleep state, and the temperature is heated to the standby temperature. The temperature and rotation speed needed for actual printing may also be different due to different print jobs. Therefore, compared to driving the image forming apparatus to perform idling in the warm-up stage where the temperature is heated from above-mentioned standby temperature to the actual printing temperature, it may select that the image forming apparatus may be driven to start idling during the warm-up stage where cleaning, heating, and pressurizing are performed after power-on or wake-up from the sleep state, and the temperature is heated to the standby temperature, which may not consider factors that affect speed, such as paper types for print jobs and the like. At such stage, a preset speed idling may be performed, which may simplify idling control of the printer; and the warm-up stage may be a needed stage before printing is performed, which may also reduce the time for print output.

Moreover, the time for driving the image forming apparatus to start idling may be above-mentioned warm-up stage before starting image formation, idling may also be performed immediately after power-on or wake-up from the sleep state, or idling may start to be performed after a preset time duration has passed after power-on or wake-up from the sleep state, or idling may be performed at a certain time duration before warm-up or a certain time duration before the first page is printed, and the like. In addition, the idling time may also be configured to have different lengths according to different condition needs (such as ambient temperature and humidity, or different printing modes).

Obviously, idling may be performed in the warm-up stage before image formation, idling and warm-up may be performed simultaneously, and idle time other than the warm-up time may not be needed, thereby shortening time for printing the first page. According to embodiments of the present disclosure, the image forming apparatus may be controlled to perform idling according to the usage of the toner cartridge and it may avoid the problem that direct usage of the moist toner in the new toner cartridge for printing may result in serious background gray in printed images when the image forming apparatus uses a new toner cartridge.

According to embodiments of the present disclosure, the image forming apparatus may be enabled to perform idling for a time duration before starting image formation to mix the moist toner with the non-moist toner, thereby reducing the background gray of printed images and avoiding reduced image quality problem when the moist toner is used to perform printing.

Figure 1B:
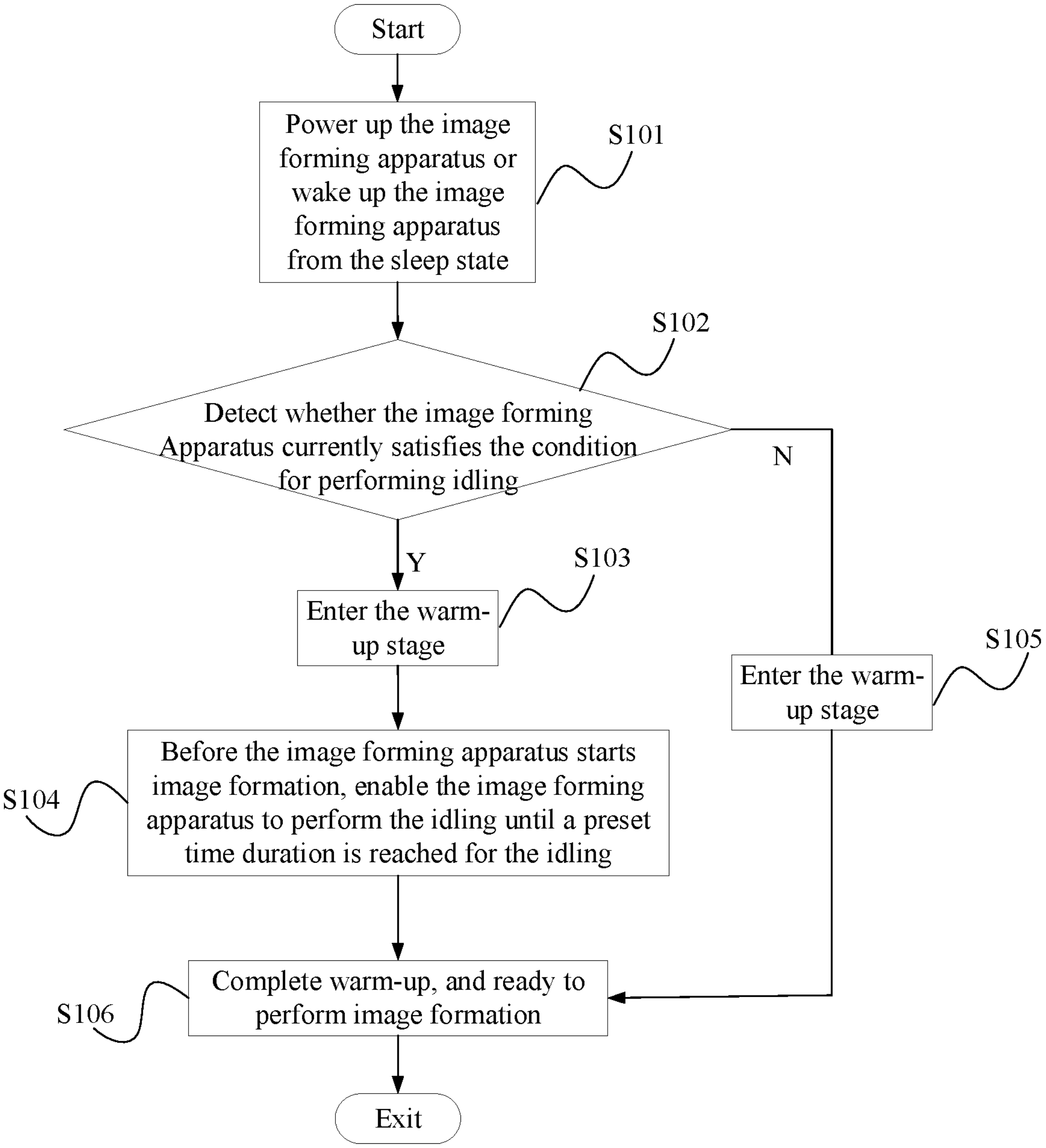
FIG. 1B illustrates an overall control flowchart of a control method of an image forming apparatus provided by exemplary embodiments of the present disclosure.

FIG. 1B illustrates an overall control flowchart of a control method of an image forming apparatus provided by exemplary embodiments of the present disclosure. The control method may include following exemplary steps.

At S101, the image forming apparatus may be powered on or woken up from a sleep state.

First, when the image forming apparatus is in an off state, the image forming apparatus may be powered on; or when the image forming apparatus is in the sleep state, the image forming apparatus may be woken up from the sleep state. The image forming apparatus may be woken up from the sleep state, which may be, for example, that a related operation command issued by a user may be received, such that the sleep state may be woken up, or the sleep state may be woken up through speaking a wake-up word by the user, or the sleep state may be woken up by pressurizing a related button, and the like. S102 may be proceeded after the image forming apparatus is powered on or woken up from the sleep state.

At S102, whether the image forming apparatus currently satisfies the condition for performing idling may be detected.

Whether the image forming apparatus currently satisfies the condition for performing idling may be detected, that is, whether the toner cartridge of the image forming apparatus is used for the first time or whether the image forming apparatus has performed idling may be detected. That is, the condition for performing idling herein may indicate that the toner cartridge installed in the image forming apparatus is used for the first time and may also indicate that the image forming apparatus has not performed idling on the toner cartridge. The process of detecting and determining whether the condition for performing idling is satisfied is as described in above-mentioned S10, which may not be described in detail herein. When it detects and determines that the toner cartridge installed in the image forming apparatus is used for the first time or the image forming apparatus has not performed idling on the toner cartridge, S103 may be proceeded; otherwise S105 may be proceeded.

At S103, the warm-up stage may be entered.

If it detects and determines that the image forming apparatus currently satisfies the condition for performing idling, the image forming apparatus may start to enter the warm-up stage. That is, the image forming apparatus may start to perform cleaning, heating (or pre-heating), and pressurizing, the printing temperature may be heated to the standby temperature by driving the fuser-heating roller to rotate; and when the actual printing temperature needed of the print job is determined, the temperature may be further heated from the standby temperature to the actual printing temperature. Optionally, entering the warm-up stage here may be entering a warm-up stage where cleaning, heating, and pressurizing are performed, and the printing temperature is heated to the standby temperature by driving the fuser-heating roller to rotate.

In addition, the order of two steps S102 and S103 may be reversed or performed simultaneously. In other words, above-mentioned S102 may be performed first to detect whether the image forming apparatus currently satisfies the condition for performing idling, and then S103 may be proceeded to enter the warm-up stage when it determines that the image forming apparatus currently satisfies the condition for performing idling; or after the image forming apparatus is powered on or woken up from the sleep state, S103 may be performed first to start to enter the warm-up stage, and then S102 may be proceeded to detect whether the condition for performing idling is currently satisfied; or after the image forming apparatus is powered on or woken up from the sleep state, S102 may be proceeded to detect whether the condition for performing idling is currently satisfied, and S103 may be proceeded to start to enter the warm-up stage, simultaneously. Obviously, with regard to detecting whether the image forming apparatus currently satisfies the condition for performing idling, in addition to performing the detection after the image forming apparatus is powered on or woken up from the sleep state, the detection may also be started to be performed at the same time as entering the warm-up stage after the image forming apparatus is powered on or woken up from the sleep state; or the detection may be started after entering the warm-up stage for a certain time duration, for example, at the same time as entering the warm-up stage where the temperature is heated to the standby temperature or after a certain time duration has passed; or the detection may be started at the same time as entering the warm-up stage of heating from the standby temperature to the actual printing temperature or after a certain period of time has passed. Optionally, comparing with above-mentioned detection triggering time of whether the idling condition is satisfied, the detection may be selected to be performed before entering the warm-up stage after power-on or wake-up from the sleep state, or the detection may be selected to be performed at the same time as the start of entering the warm-up stage where the image forming apparatus is heated to the standby temperature. In such way, it ensures that performing idling may be completed within the time duration of the warm-up stage under the condition of determining that idling needs to be performed, so that no additional idling time may be needed.

At S104, before the image forming apparatus starts image formation, the image forming apparatus may be enabled to perform the idling until a preset time duration is reached for the idling.

If the image forming apparatus currently satisfies the condition for performing idling, in a warm-up stage before starting image formation, the image forming apparatus may be driven to start idling. That is, at least one component of an OPC, a developing roller, a toner feeding roller, and a stirring blade in the image forming apparatus may be driven to start idling, and timing may be controlled to perform idling to reach a preset time duration, such that idling may be performed at the same time as at the warm-up stage. Timing of the preset time duration which may be a cumulative timing (e.g., 30 s), or a countdown (e.g., 30 s). After performing idling is completed and the warm-up stage before image formation is completed, step S106 may be proceeded. It should be noted that, as described in S20, the warm-up stage herein may be divided into two stages. That is, the warm-up stage before starting image formation herein may be the warm-up stage where cleaning, heating, and pressurizing are performed after power-on or wake-up from the sleep state, and the temperature is heated to the standby temperature; or may be the warm-up stage where the temperature is heated from above-mentioned standby temperature to the actual printing temperature. Optionally, the image forming apparatus may be driven to start idling during the warm-up stage where cleaning, heating, and pressurizing are performed after power-on or wake-up from the sleep state, and the image forming apparatus is heated to the standby temperature. The temperature and rotation speed needed for actual printing may also be different due to different print jobs. Therefore, compared to performing idling in the warm-up stage where the temperature is heated from above-mentioned standby temperature to the actual printing temperature, it may select that the image forming apparatus may be driven to start idling during the warm-up stage where cleaning, heating, and pressurizing are performed after power-on or wake-up from the sleep state, and the image forming apparatus is heated to the standby temperature, which may not consider factors that affect speed, such as paper types for print jobs and the like. At such stage, a preset speed idling may be performed, which may simplify idling control of the printer; and the warm-up stage may be a needed stage before printing is performed, which may also reduce the time for print output.

At S105, the warm-up stage may be entered.

As in above-mentioned S102, it detects whether the image forming apparatus currently satisfies the condition for performing idling; and when it detects and determines that the condition for performing idling is not currently satisfied, that is, when the image forming apparatus currently detected has performed idling or that the toner cartridge is not used for the first time, the warm-up stage may be directly entered. Different from entering the warm-up stage in S103, when it detects and determines that the image forming apparatus currently does not satisfy the condition for performing idling, the fuser-heating roller may be driven to perform rotation along a direction different from the rotation direction of the heating roller in S103 to perform warm-up (including e.g., pre-heating); and the OPC, the toner feeding roller, the stirring blade, and other components may not need to be driven to perform idling, which may save power consumption, simplify operations, and further reduce pre-printing time. After the warm-up stage is completed, S106 may be proceeded.

At S106, the warm-up may be completed, and image formation may be ready to be performed.

After the warm-up stage is completed, the image formation may be ready to be performed; or after the image forming apparatus completes performing idling, in the case that the warm-up stage is completed, the image formation may be ready to be performed. Obviously, by simultaneously performing idling and the warm-up stage before image formation, additional time may be avoided to perform idling, thereby reducing the time for print output.

According to embodiments of the present disclosure, the image forming apparatus may be enabled to perform idling for a time duration before starting image formation to mix the moist toner with the non-moist toner, thereby reducing the background gray of printed images and avoiding reduced image quality problem when the moist toner is used to perform printing.

Figure 2:
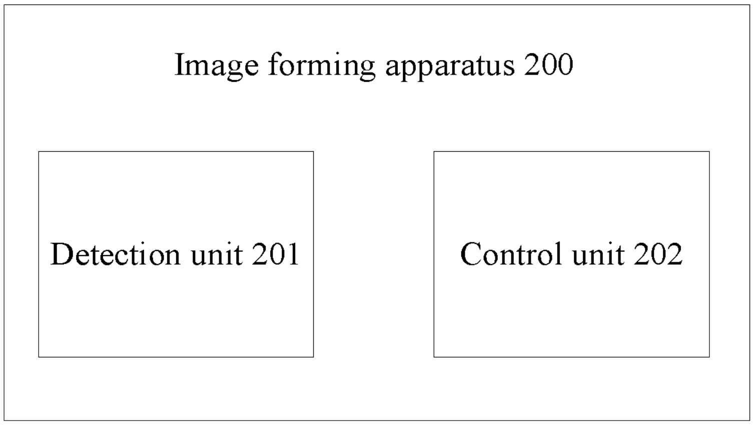
FIG. 2 illustrates a structural schematic of modules of an image forming apparatus provided by exemplary embodiments of the present disclosure.

Referring to FIG. 2, embodiments of the present disclosure provide an image forming apparatus 200. The image forming apparatus 200 may include a detection unit 201 and a control unit 202. The detection unit 201 may be mainly configured to detect whether the image forming apparatus currently satisfies the condition for performing idling. That is, before the image forming apparatus 200 starts image formation, the detection unit 201 may detect whether the toner cartridge installed in the image forming apparatus 200 is a new toner cartridge or used for the first time or whether the image forming apparatus 200 has performed idling. For example, after the toner cartridge is installed in the image forming apparatus, the toner cartridge may exchange information with the image forming apparatus 200, so that the detection unit 201 may detect whether the toner cartridge is a new toner cartridge or used for the first time; or detect related information of whether the image forming apparatus 200 has ever performed idling by accessing a storage unit (the storage unit may be included in the toner cartridge, or may be included inside the main body of the image forming apparatus 200) where the condition information for performing idling is recorded. That is, the storage unit may be accessed to detect whether the idling mark stored in the storage unit indicates that idling has been performed or has not been performed; or the storage unit may be accessed to detect whether there is an idling mark or whether the mark bit in the storage unit indicates that idling has been performed or has not been performed. The control unit 202 may be configured to, when the condition for performing idling is satisfied and before the image forming apparatus starts image formation, enable the image forming apparatus to perform the idling until a preset time duration is reached for the idling.

That is, the control unit 202 may, based on the detection unit 201, detect that the toner cartridge is used for the first time or is a new toner cartridge or that the image forming apparatus has not performed idling, such that the control unit 202 may control at least one component of the OPC, the developing roller, the toner feeding roller and the stirring blade in the image forming apparatus 200 to perform idling in the warm-up stage before starting image formation, and control performing idling timing to reach a preset time duration. For example, performing idling accumulative timing may be controlled to be 30*s*, or performing idling countdown may be controlled to be 30*s*, or continuous performing idling timing may be controlled to be other time durations according to different condition needs (such as ambient temperature and humidity, or different printing modes). It should be further noted that the warm-up stage before starting image formation herein may refer to the warm-up stage where cleaning, heating, and pressurizing are performed after power-on or wake-up from the sleep state, and the temperature is heated to the standby temperature; or may refer to the warm-up stage where the temperature is heated from above-mentioned standby temperature to the actual printing temperature. Optionally, the image forming apparatus may be driven to start idling during the warm-up stage where cleaning, heating, and pressurizing are performed after power-on or wake-up from the sleep state, and the image forming apparatus is heated to the standby temperature. The temperature and rotation speed needed for actual printing may also be different due to different print jobs. Therefore, compared to performing idling in the warm-up stage where the temperature is heated from above-mentioned standby temperature to the actual printing temperature, it may select that the image forming apparatus may be driven to start idling during the warm-up stage where cleaning, heating, and pressurizing are performed after power-on or wake-up from the sleep state, and the image forming apparatus is heated to the standby temperature, which may not consider factors that affect speed, such as paper types for print jobs and the like. At such stage, a preset speed idling may be performed, which may simplify idling control of the printer; and the warm-up stage may be a needed stage before printing is performed, which may also reduce the time for print output. In addition, the time for controlling the image forming apparatus 200 to start idling may be at above-mentioned warm-up stage before starting image formation, idling may also be performed immediately after power-on; idling may start to be performed after a preset power-on time, or idling may be performed at a certain time duration before warm-up or a certain time duration before the first page is printed, and the like.

The image forming apparatus of embodiments of the present disclosure may detect whether the condition for performing idling is satisfied before printing. The condition for performing idling may include that the toner cartridge is used for the first time, or the idling mark stored in the main body of the image forming apparatus or the toner cartridge indicates that idling is needed. When it detects that the condition for performing idling is satisfied, the image forming apparatus may perform idling for a time duration before executing print out. The moist toner may be mixed with the non-moist toner, thereby reducing the background gray of printed images and avoiding reduced image quality problem when the moist toner is used to perform printing.

Figure 3:
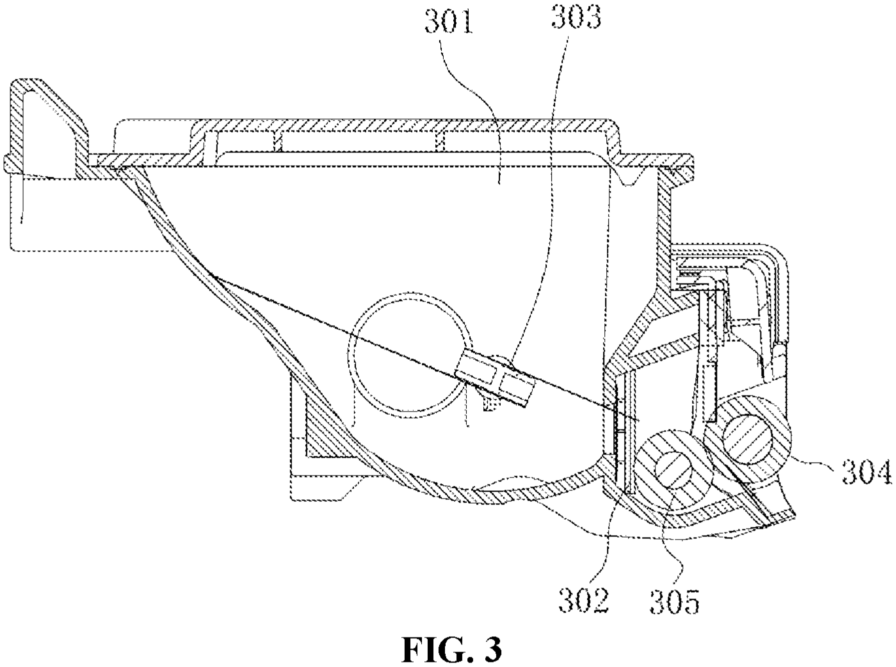
FIG. 3 illustrates an internal structural schematic of a toner cartridge in an image forming apparatus provided by exemplary embodiments of the present disclosure.

FIG. 3 illustrates an internal structural schematic of a toner cartridge in an image forming apparatus provided by exemplary embodiments of the present disclosure. The toner cartridge may include a toner hopper 301, a sealing film 302, a stirring blade 303, a developing roller 304, and a toner feeding roller 305. The toner hopper 301 may be mainly configured for loading toner; the sealing film 302 may be mainly configured for sealing the toner loaded in the toner hopper 301; the stirring blade 303 may be mainly configured for stirring the toner in the toner hopper 301, and sending the toner out of the toner hopper 301; the developing roller 304 may be configured for supplying the toner to the OPC; and the toner feeding roller 305 may be configured for feeding the toner to the developing roller 304.

It should be further noted that above-mentioned sealing film 302 may isolate the toner in the toner hopper 301 into two parts. That is, most toner may be isolated and sealed in the sealing film, and a small amount of the toner may be isolated outside the sealing film and may not be sealed by the sealing film 302. Therefore, in the environment of high temperature and high humidity, the part of the toner outside the sealing film 302 may be likely to be moist; and especially for a new toner cartridge that is used for the first time, such small amount of the toner may be likely to be moist. After removing the sealing film 302, the moist toner and the non-moist toner protected by the sealing film 302 may be sufficiently mixed by rotating at least one component of the OPC, the stirring blade 303, the developing roller 304, and the toner feeding roller 305. The rotation mode (e.g., manner), that is, the moist toner and the non-moist toner may be sufficiently mixed by rotating at least one component of the OPC, the stirring blade 303, the developing roller 304 and the toner feeding roller 305, may be performed through the driving of a gear mechanism at one end of the toner cartridge shown in FIG. 4. The structure and driving process of the gear mechanism at one end of the toner cartridge may be further described in detail below.

Figure 4:
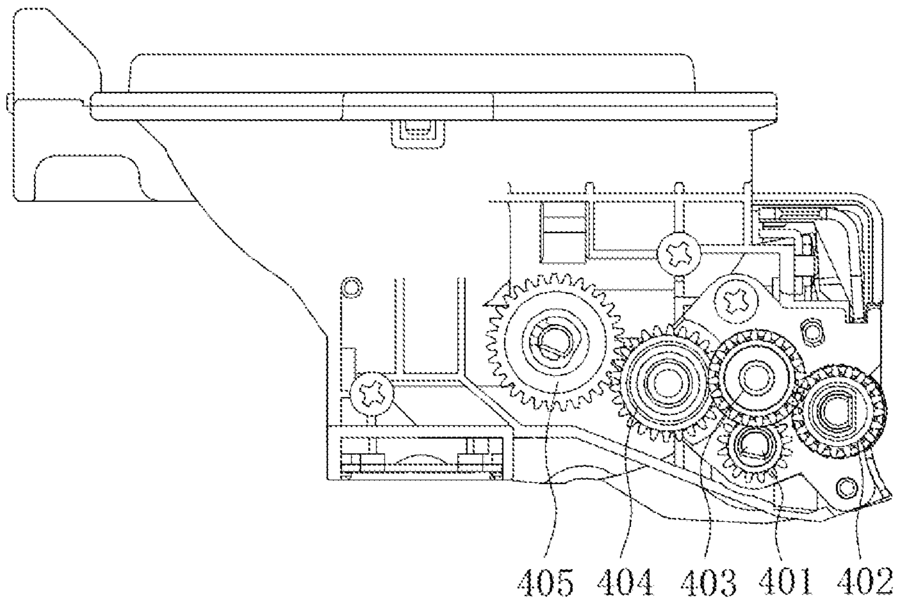
FIG. 4 illustrates a structural schematic of a gear mechanism at an end of a toner cartridge provided by exemplary embodiments of the present disclosure.

FIG. 4 illustrates a structural schematic of a gear mechanism at an end of a toner cartridge provided by exemplary embodiments of the present disclosure. The gear mechanism may include a toner feeding roller gear 401 fixed at one end of the toner feeding roller 305, a developing roller gear 402 fixed at one end of the developing roller 304, a toner feeding roller transmission gear 403, a stirring blade transmission gear 404, and a stirring blade gear 405 fixed at one end of the stirring blade 303. First, an OPC gear (not shown) may receive an external driving force and start to rotate, thereby driving the developing roller gear 402 to rotate. The developing roller gear 402 may mesh with the toner feeding roller transmission gear 403, thereby driving the toner feeding roller transmission gear 403 to rotate along with the rotation of the developing roller gear 402. The toner feeding roller transmission gear 403 may mesh with the toner feeding roller gear 401 and the stirring blade transmission gear 404 in addition to meshing with the developing roller gear 402. Therefore, the driving force may be transmitted from the developing roller gear 402 to the toner feeding roller gear 401 and the stirring blade transmission gear 404 through the toner feeding roller transmission gear 403, thereby driving the toner feeding roller gear 401 and the stirring blade transmission gear 404 to rotate. The stirring blade transmission gear 404 may mesh with the stirring blade gear 405, so that the stirring blade gear 405 may be driven by the driving force and start to rotate along with the rotation of the stirring blade transmission gear 404. According to the manner of transmitting the driving force by the toner feeding roller transmission gear 403 and the stirring blade transmission gear 404, two or three adjacent gears may be better meshed with each other simultaneously, thereby driving the gears to rotate simultaneously. With the rotation of the gears, corresponding connected components may also rotate. Therefore, finally, the stirring blade 403 may be driven to start to rotate by driving the stirring blade gear 405 to rotate, such that the moist toner in the toner hopper 301 and the non-moist toner sealed by the sealing film 302 may be fully stirred and mixed.

In various embodiments of the present disclosure, whether performing idling is needed may be determined by detecting whether the image forming apparatus has performed idling or whether the toner cartridge is used for the first time; and if it determines that performing idling is needed, idling may be performed for a preset time duration in the warm-up stage before starting image formation, which may fully mix the moist toner and the non-moist toner by idling while performing warm-up. On the one hand, it may avoid the background gray on printed pictures using the moist toner, which may lead to picture quality reduction and may not meet the user's expectation; on the other hand, the print output time may also be shortened to a certain extent.

Furthermore, embodiments of the present disclosure also provide an electronic apparatus including a memory, a processor and a computer program, where the computer program may be stored in the memory and the processor may be configured to implement above-described method.

Furthermore, embodiments of the present disclosure also provide a non-transitory computer-readable storage medium on which a computer program is stored. The steps of above-mentioned method may be implemented when the program is executed.

It can be understood that the structures illustrated in embodiments of the present disclosure may not limit the image forming apparatus 200. In other embodiments of the present disclosure, the image forming apparatus 200 may include more or less components in FIG. 2, or some components may be combined or separated, or components may be arranged differently in the image forming apparatus. Illustrated components may be implemented in hardware, software, or a combination of software and hardware.

Various embodiments of the present disclosure provide an image forming apparatus. The apparatus includes a memory, storing a computer program for performing a control method of the image forming apparatus; and a processor, coupled with the memory and when the computer program being executed, configured to: detect whether the image forming apparatus currently satisfies a condition for performing idling; and when the condition for performing the idling is satisfied and before the image forming apparatus starts image formation, enable the image forming apparatus to perform the idling until a preset time duration is reached for the idling.

Various embodiments of the present disclosure provide a non-transitory computer-readable storage medium containing a computer program, and when being executed, the computer program causes a processor to perform a control method of an image forming apparatus. The method includes detecting whether the image forming apparatus currently satisfies a condition for performing idling; and when the condition for performing the idling is satisfied and before the image forming apparatus starts image formation, enabling the image forming apparatus to perform the idling until a preset time duration is reached for the idling.

In the description of the present disclosure, unless otherwise expressly specified and limited, the terms "connected", "fixed" and the like should be understood in a broad sense. For example, "connection" may be a fixed connection, a detachable connection, an integral connection, or an electrical connection; or may be a direct connection or an indirect connection through an intermediate medium. For those skilled in the art, meanings of above-mentioned terms in the present disclosure may be understood according to specific situations.

The above descriptions may merely be optional embodiments of the present disclosure and may not be intended to limit the present disclosure. Any modifications, equivalent replacements, improvements and the like made within the spirit and principle of the present disclosure shall be included within the protection scope of the present disclosure.

What is claimed is:

1. A non-transitory computer-readable storage medium containing a computer program, and when being executed, the computer program causes a processor to perform a control method of an image forming apparatus, the method comprising:

detecting whether the image forming apparatus satisfies a condition for performing idling; and when the condition for performing the idling is satisfied, enabling the image forming apparatus to perform the idling until a preset time duration in a warm-up stage before the image forming apparatus starts image formation, wherein in the warm-up stage, the image forming apparatus is heated up to a target temperature for actual printing, wherein the preset time duration is determined according to ambient temperature and humidity of the image forming apparatus, wherein the idling is performed to mix a moist toner portion with a non-moist toner portion of a toner, wherein the moist toner portion and the non-moist toner portion of the toner are from a same toner cartridge, and wherein the condition for performing the idling includes that a main body of the image forming apparatus and the toner cartridge exchange information to detect whether an idling mark has been stored in the toner cartridge, and the detecting whether the image forming apparatus satisfies the condition for performing idling further includes:

connecting the main body of the image forming apparatus to the toner cartridge;

accessing a mark bit stored in an internal storage of the toner cartridge; and determining if the condition for performing the idling is satisfied based on the mark bit indications being "0" or "1" to indicate whether the idling needed to be performed.

2. The non-transitory computer-readable storage medium according to claim 1, wherein enabling the image forming apparatus to perform the idling includes:

enabling a rotation of at least one component of an organic photoconductor (OPC), a developing roller, a toner feeding roller, and a stirring blade in the image forming apparatus.

3. The non-transitory computer-readable storage medium according to claim 1, wherein:

the warm-up stage for performing the idling before the image forming apparatus starts the image formation includes a first warm-up stage for performing cleaning, pressurizing, and heating to a standby temperature after the image forming apparatus is powered on or woken up from a sleep state.

4. The non-transitory computer-readable storage medium according to claim 1, wherein:

the condition for performing the idling includes that a toner cartridge of the image forming apparatus is used for a first time or the idling of the image forming apparatus is not performed.

5. The non-transitory computer-readable storage medium according to claim 3, wherein the warm-up stage further includes a second warm-up stage where a temperature is heated from the standby temperature to the target temperature for actual printing.

6. A control method of an image forming apparatus, comprising:

detecting whether the image forming apparatus satisfies a condition for performing idling; and when the condition for performing the idling is satisfied, enabling the image forming apparatus to perform the idling until a preset time duration in a warm-up stage before the image forming apparatus starts image formation, wherein in the warm-up stage, the image forming apparatus is heated up to a target temperature for actual printing, wherein the preset time duration is determined according to ambient temperature and humidity of the image forming apparatus, wherein the idling is performed to mix a moist toner portion with a non-moist toner portion of a toner, wherein the moist toner portion and the non-moist toner portion of the toner are from a same toner cartridge, and wherein the condition for performing the idling includes that a main body of the image forming apparatus and the toner cartridge exchange information to detect whether an idling mark has been stored in the toner cartridge, and the detecting whether the image forming apparatus satisfies the condition for performing idling further includes:

connecting the main body of the image forming apparatus to the toner cartridge;

accessing a mark bit of the idling mark stored in an internal storage of the toner cartridge; and determining if the condition for performing the idling is satisfied based on the mark bit indications being “0” or “1” to indicate whether the idling needed to be performed.

7. The method according to claim 6, wherein enabling the image forming apparatus to perform the idling includes:

enabling a rotation of at least one component of an organic photoconductor (OPC), a developing roller, a toner feeding roller, and a stirring blade in the image forming apparatus.

8. The method according to claim 6, wherein:

the warm-up stage for performing the idling before the image forming apparatus starts the image formation includes a first warm-up stage for performing cleaning, pressurizing, and heating to a standby temperature after the image forming apparatus is powered on or woken up from a sleep state.

9. The method according to claim 8, wherein the warm-up stage further includes a second warm-up stage where a temperature is heated from the standby temperature to the target temperature for actual printing.

* * * * *